United States Patent [19]

West

[11] 4,030,304
[45] June 21, 1977

[54] FLOATING BOOM
[75] Inventor: Robert E. West, Yardley, Pa.
[73] Assignee: Cascade Industries, Incorporated, Edison, N.J.
[22] Filed: Mar. 17, 1976
[21] Appl. No.: 667,784
[52] U.S. Cl. .............................. 61/1 F; 24/263 FC; 24/263 SW; 24/265 R
[51] Int. Cl.² ...................... E02B 15/04; E02B 3/00
[58] Field of Search .................. 61/1 F, 5; 210/242; 24/263 FC, 263 R, 263 HE, 263 PC, 263 SW, 265 EC, 265 R; 160/349

[56] References Cited
UNITED STATES PATENTS

| 2,765,487 | 10/1956 | Foster | 160/349 |
|---|---|---|---|
| 2,866,249 | 12/1958 | Normandin | 24/263 FC |
| 3,563,036 | 2/1971 | Smith et al. | 61/1 F |
| 3,640,073 | 2/1972 | Samsel | 61/1 F |
| 3,691,774 | 9/1972 | Mard | 61/5 |
| 3,703,811 | 4/1972 | Smith | 61/1 F |
| 3,756,031 | 9/1973 | Smith et al. | 114/.5 F |
| 3,839,869 | 10/1974 | Green | 61/1 F |
| 3,849,989 | 11/1974 | Preus | 61/1 F |
| 3,852,965 | 12/1974 | Rudd | 61/1 F |
| 3,971,220 | 7/1976 | Kiwase et al. | 61/1 F |

FOREIGN PATENTS OR APPLICATIONS 7,103,594  9/1971  Netherlands ................ 61/1 F Primary Examiner—Paul R. Gilliam
Assistant Examiner—Alex Grosz
Attorney, Agent, or Firm—Sperry and Zoda

[57] ABSTRACT

A boom is disclosed having an elongated flexible skirt confined between and secured to a series of floats arranged in pairs. The floats of each pair are identically formed, and are oppositely arranged at opposite sides of the skirt, to which they are secured in such fashion as to dispose the upper edge portion of the skirt above the water level. The lower edge of the skirt extends downwardly below the water level a suitable distance to confine pollutants, such as oil, floating upon the surface of the water. A tension member extends along the bottom edge of the skirt, in the form of a flexible cable. The tension member is retained in position through passage thereof within longitudinal bores provided in clamp assemblies regularly spaced along the length of the skirt. Each clamp assembly comprises complementary metal clamp elements, particularly shaped as to permit their being formed as extrusions. The clamp elements are so designed as to be swiftly applicable to opposite sides of the skirt, in such fashion as to interlock with the skirt and with each other.

The clamp assemblies are further characterized in that they are adapted to be swaged to the tension cable passing therethrough, in an arrangement that eliminates stressing of the skirt in the areas between the clamp assemblies, when the equipment is in use.

The float construction is of significance, in that it has a cross-sectional shape particularly adapted to provide for an exceptionally stable float action, including a special capability of deflecting waves, that may otherwise tend to wash over the floats in a manner tending to free pollutants from the confined area or generally render the floats more subject to wave action than is desirable.

1 Claim, 6 Drawing Figures

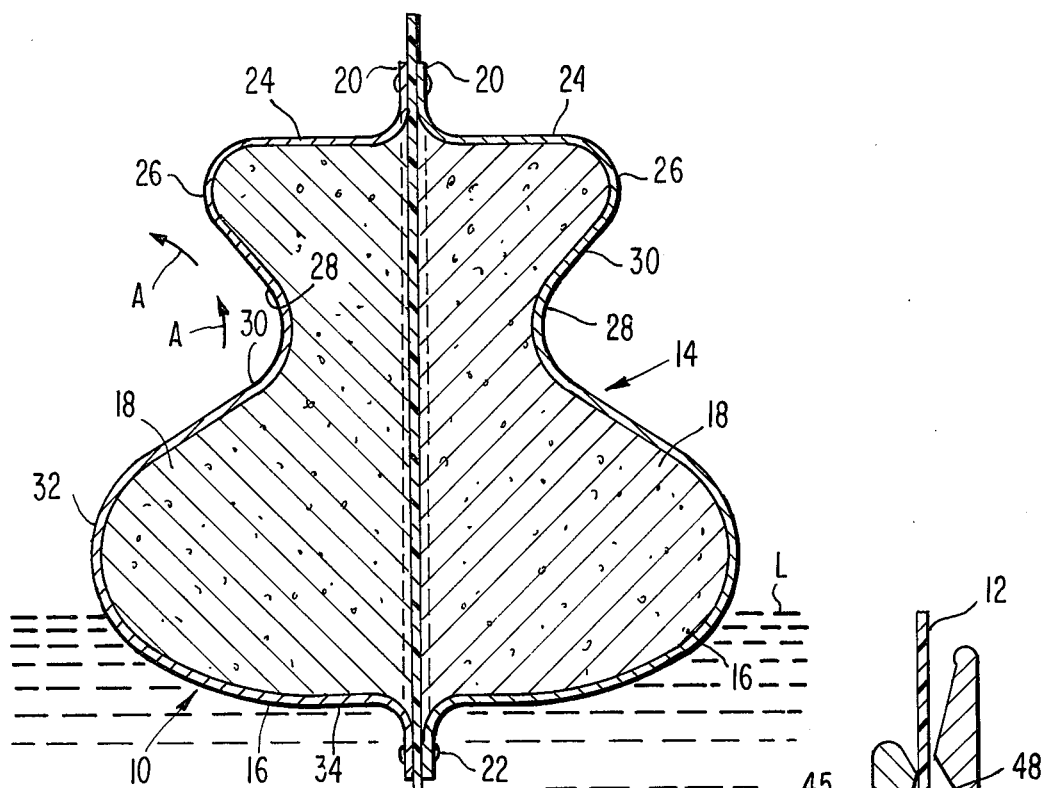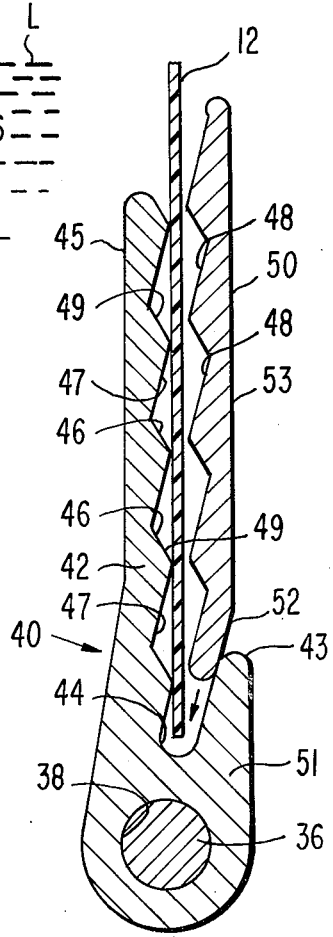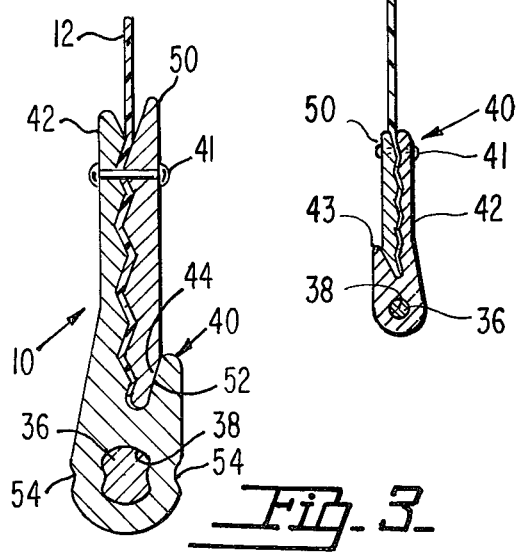

FLOATING BOOM

BACKGROUND OF THE INVENTION

1. Field of the Invention

In its most general aspect, the present invention relates to the broad category of hydraulic engineering. Within that category the invention relates to the field of water control, and in particular to the control of matter buoyantly supported upon the water.

2. Description of the Prior Art

In recent years, there has been widespread development of floating boom constructions, stimulated by the intense concern with which pollution of the environment is regarded at this time by the world's population.

Most usually, floating booms designed to confine oil or other floating pollutants are characterized by the provision of an elongate, flexible skirt adapted to be drawn around the area in which the pollutant is to be confined, and buoyantly supported through the provision of floats or their equivalents. Such booms, desirably, should be capable of being folded, accordion fashion, when not in use, and may comprise a plurality of hingedly connected, like sections.

Booms as now known, however, though in many instances possessed of a high degree of efficiency in respect to their operational characteristics, nevertheless have certain deficiencies. For example, it is highly desirable to provide a tension member along the lower edge of the buoyantly supported, generally vertically positioned skirt. The tension member as heretofore used in the art is designed to accept stresses which, for example, may be exerted longitudinally of the skirt. In accepting said stresses, the tension member reduces the possibility of rupture of the skirt fabric, and in addition may aid in imparting a particular operational shape to the fabric found to be especially effective. An example of the use of a tension member in imparting a curved or inclined shape or posture to a skirt in use may be osbserved, for example, in United States patent issued to Rudd, U.S. Pat. No. 3,852,965, issued Dec. 10, 1974. In that patent, the tension member or lower cable is utilized as a tow line, adapted to be pulled in advance of an upper tow line, and the particular cross-sectionally curved configuration imparted to the skirt by the arrangement effectively deflects water currents downwardly and inwardly of the area circumscribed by the boom. Such an arrangement is characteristic of the present invention, being found desirable in booms of this type.

In the mentioned patent, however, as well as in other patents covering floating booms, no provision is made for assuring against the application of stresses to the skirt, in a way to reduce to a complete minimum any tendency of the skirt to rupture during use.

Further, in the prior art booms, the floats connected to the upper edge portion of the skirt have not had a cross-sectional configuration which is specifically designed to impart a highly desirable wave deflecting characteristic to the floats, such as to cause waves or wavelets that strike the float to be turned upwardly and inwardly of the confined area about which the floating boom extends, in a manner calculated to increase the stability of the boom, its resistance to wave action, and its efficiency in confining to said area the oil or other buoyantly supported contaminant.

Still further, the prior art, so far as is known, has failed to produce a means for supporting the lower tension member or cable from the skirt, such as to permit swift and easy connection of the cable to the skirt for the purpose of reducing manufacturing costs, while at the same time permitting the tension member to be fixedly secured to the skirt at regularly spaced intervals along its length, whereby to minimize any tendency of the skirt to rupture at locations along the lower longitudinal edge thereof.

SUMMARY OF THE INVENTION

Summarized briefly, the construction for which patent protection is sought comprises a plurality of like sections, adapted to be connected in end to end relationship in such fashion as to be foldable accordion style when not in use. The sectionally formed boom comprising the present invention incorporates, in each section, means at opposite ends of the section for mating relationship with corresponding means of adjacent sections, to effect the stated hinged type connection of the sections one to another.

The end-connecting means described are secured to the end edges of an elongate, generally rectangular, flexible skirt which in the present instance is formed from a liquid-impervious plastic material. Secured to the upper edge portion of the skirt are pairs of floats, that is, spaced longitudinally of the skirt are floats symmetrically related to the skirt, each float comprising identical but oppositely arranged sections secured to opposite faces of the skirt. The sections, when so secured, impart to each float a cross-sectional configuration which may be appropriately described as comprising bulbous lower portion merging into recessed midportions which in turn merge into bulbous upper portions smaller in cross-sectional size than the lower portions. The recesses, thus, extend continuously along the length of each float, and are so designed as to serve as wave deflectors adapted to receive waves or wavelets, and turn them back into the area about which the boom extends.

BRIEF DESCRIPTION OF THE DRAWING

FIG. 3 is an enlarged, detail cross-sectional view through the tension member and associated clamping assembly, as seen on line 3—3 of FIG. 1;

FIG. 4 is a cross-sectional view through the floating boom, on an enlarged scale, portions being broken away, on line 4—4 of FIG. 1;

FIG. 5 is a still further enlarged, detail sectional view on the same cutting plane as FIG. 3, showing the clamp assembly in relation to the skirt, at an intermediate step of connection of said assembly to the skirt.

DESCRIPTION OF THE PREFERRED EMBODIMENT

Figure 1:
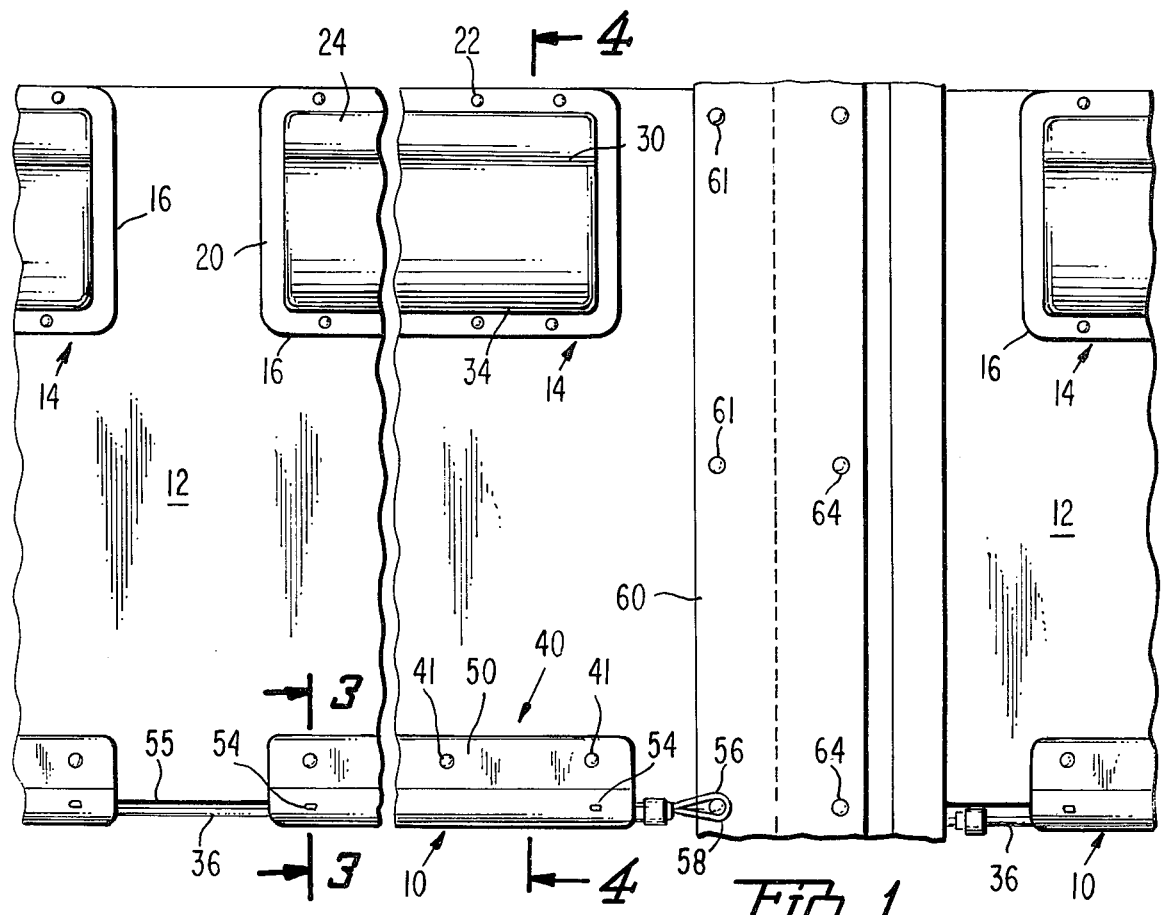
FIG. 1 is a fragmentary side elevational view of a floating boom according to the present invention.

Designated generally by the reference numeral 10 are like boom sections, connected in end to end relationship and adapted to be permanently secured to each other in such fashion as to provide a continuous floating boom impervious to the passage of water or contaminants when extended about an area in which said contaminants are to be confined. The boom sections 10 are all identical one with another, and accordingly the description of one will suffice for all.

Each section 10 of the floating boom comprises an elongated skirt 12 which in a presently preferred embodiment and as illustrated, is formed of a plastic material, as for example, a nylon fabric laminated with neoprene or some other type of flexible plastic that would be substantially unaffected by the action of oil, sea water or the like. The specific material used does not, it may be noted, comprise a part of the present invention, it being mainly important that said material be rugged, durable, flexible, strongly resistant to rupture under stress, and adapted for ready deformation so as to permit the skirt to be lockingly engaged in a deformed condition, by the clamp assembly used for attaching the tension member to the lower edge portion thereof.

Spaced uniformly along the upper edge portion of the skirt are floats 14 each of which is of elongated configuration, each float in the illustrated example being of rigid formation, comprising, for example, a molded shell confining solid or particulate buoyant material 18. Each float 14, as shown in FIG. 4, is symmetrically disposed in respect to the skirt 12, and comprises a pair of identically formed, oppositely arranged float sections 16, secured to opposite faces of the skirt 12 through the provision of peripheral flanges 20 formed upon the respective float sections, said flanges having registering apertures through which rivets or other fastening elements extend as at 22, for the purpose of permanently and fixedly securing the float sections to the opposite faces of the upper edge portion of the skirt.

The particular cross-sectional shape of each float 14 is of importance. Each float, as seen from FIG. 4, is bisected by a vertical plane coincident with the plane of the skirt 12, and at opposite sides of said plane, each float is formed with a horizontally disposed top wall portions 24, merging along their outer edges along curving lines into outwardly curved, bulged top float portions 26, which in turn merge along their lower edges into oppositely, inwardly curved reentrant midportions 28. The description of each float given above is in the sense, of course, of the cross-sectional shape of the float, and continuing with such description, it will be observed from FIG. 4 that the inwardly curved reentrant mid-portions of the float when viewed in cross section define recesses 30 that extend (see FIG. 1) along the full length of each float, continuously up to the peripheral flange 20, said recesses being provided at opposite sides of the skirt by reason of the symmetrical relationship of the float to the skirt. As seen by the directional arrows A in FIG. 4, waves contacting the float 14 from either side thereof will be caused to deflect or travel upwardly along the outwardly curved lower, bulbous portion 32 into the inwardly curved reentrant recess 30, and will be deflected by the wall of the recess reversely, instead of washing pollutants across the boom structure, thus returning to the side of the boom structure from whence they approached the same.

The bulbous lower portion is provided with a bottom wall 34 which is curved to a position approaching the horizontal, again as clearly shown in FIG. 4.

This arrangement or form of the lower portion 34 is calculated to impart a high degree of stability to the boom, tending to retain the boom in its proper operational posture within the water, despite the use of the same in rough water, in that it presents a "hard bilge" supported by the upper part of the wall of portion 32 where it merges into reentrant portion 28.

A construction as illustrated causes the floats to ride quite high in the water as shown in FIG. 4, with the recesses 30 disposed above the normal water level L a distance such as to assure to the maximum the efficient discharge of their function of deflecting waves in normal use of the boom.

A tension member 36 is in the form of a length of strong wire cable or the like, capable of being tensioned in a longitudinal direction after passage through a longitudinal bore 38 formed in a clamp assembly generally designated 40. A plurality of the assemblies would be provided in each boom section, said assemblies being generally coextensive in length, and being transversely aligned with, the several floats 14 of the section. Assemblies 40 are riveted at 41 to the skirt.

Each clamp assembly comprises a pair of cooperating, extruded metal elements, formed of aluminum or similar material. Each element is of elongated formation, and one of said elements has been designated 42, being formed approximately to a J-shape when viewed in cross section. At the base of the J there is provided, in the clamp element 42, the longitudinal bore 38 mentioned previously herein. Element 42, as seen to particular advantage in FIGS. 3 and 5, includes an upright wall 45, merging at its lower edge into the longitudinally bored bight portion of clamp element 42. In confronting relation to the lower longitudinal edge portion of the wall 45, there is formed as an integral part of said element 42, a relatively low, upstanding lip 43. Lip 43 and wall 45 define between them a longitudinal recess 44 formed in the clamp element 42, said recess extending the full length of the clamp element and being inclined from the vertical when viewed in cross section, that is, the recess 44 is disposed in a plane oblique to the general plane of the main wall 45 of element 42.

Formed upon the inner surface of the wall 45 (see FIG. 5) are longitudinally extending, low, clamping ribs 46, said ribs imparting to the inner wall surface, when viewed in cross section, a continuously serrated configuration so as to define locking or clamping teeth on said inner surface of the wall 45. Each tooth, in the illustrated example, has a pair of angularly related wall surfaces 47, 49. Surface 47, which is the lower surface in the sense of the normal usage of the floating boom, is of greater length when viewed in cross section, than is the surface 49, a construction which has been found to provide an improved locking action when the device is assembled with the skirt 12. Referring to FIG. 5, the ribs 46 are in confronting, cooperative relation to ribs 48 formed upon the inner surface of face of a second clamp element 50 also formed as an extrusion of aluminum or the like.

Clamp element 50, at its lower edge, is integrally formed with a longitudinal lip 52 inclined slightly out of the general plane of the clamp element, and in use, the parts initially appear as in FIG. 5 during manufacture of the boom. Thus, as shown in FIG. 5, the skirt 12 is disposed between the confronting, serrated or ribbed wall surfaces of the clamp elements 42, 50. Then, by shifting the clamp element 50 transversely in the direction of the bight portion 51 of the clamp element 42, locking tongue 52 will enter recess 44. The inclination of the tongue or lip 52 and recess 44 in relation to the general planes of the skirt 12, wall 45, and the main or body portion 53 of clamp element 50, causes the skirt to be deformed in the manner shown in FIGS. 3 and 4, and further causes the clamp element 50 to lock in the recess 44, with its teeth 48 in mating, interlocked relation with teeth 46 of clamp element 42.

In this way, a highly simplified, yet fully effective locking means is provided for suspending the cable 36 from the skirt in closely spaced, parallel relation to the bottom edge of the skirt.

It may now be noted, by reference to FIG. 1 and to FIG. 3, that means is also included in the invention, for locking the cable against longitudinal deviation in respect to skirt 12. This locking action, with the cable stretched to a taut condition, relieves the skirt 12 of stresses that might otherwise be imposed upon it in the areas of the skirt occurring between the clamp assemblies and the floats.

Were the cable free to shift in the longitudinal direction, it would have no adaptability for relieving the skirt of the mentioned stresses, and accordingly, at opposite ends of each clamp assembly, a swage 54 is utilized, to swage the wall of the bore into the material of the tension member 36, in such fashion as to lock the tension member in place, whereby the portion 55 (see FIG. 1) of the tension member stretched across the space between adjacent clamp assemblies, will accept stresses that might otherwise by imparted to the material of the skirt aligned transversely with these exposed portions of the cable of tension member 36.

At the ends of each boom section, cable 36 is provided with loops 56, that are secured by bolts or pins 58 to the lower ends of substantially vertically disposed, wide, metal end plates 60 fixedly secured at 61 to the skirt 12. As will be noted from FIG. 2, the end portions of the skirt 12 are disposed between clamping plates 66, secured to the end plates 60 by the rivets or equivalent fastening means 61.

Figure 2:
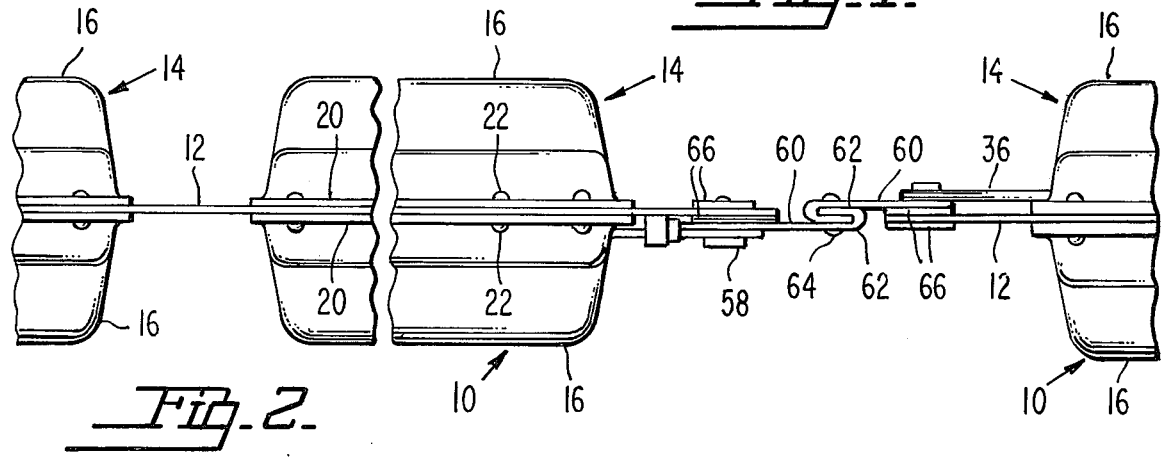
FIG. 2 is a fragmentary top plan view thereof.

The end plates project beyond the ends of the skirt, also as shown in FIG. 2, and are formed with reversely extending flanges 62 mating with corresponding flanges on the end plates of the next adjacent boom sections 10. The mating, interlocked, reversely bent flanges 62 of adjacent, connected end plates are permanently secured by rivets 64 or the like, so that the entire floating boom becomes a single, permanently assembled piece of equipment.

In use, the boom can be folded accordion fashion, by reason of the fact that in the areas occurring between the floats and clamp assemblies, skirts 12 and cables 36 are completely flexible, and can be reversely folded upon themselves.

It is contemplated that variations in the disclosed construction may be desirable in some instances. For example, the peripheral attachment of the float sections to each other and to the skirt may utilize peripherally located mating male and female protuberances (as for example ribs on one section mating with complementary recesses of the other section) that will interfit, with the skirt confined therebetween. By ultrasonic welding methods known in the art, these may be sufficient to form a permanent, liquid-tight connection of the floats to the skirt, eliminating in many cases the need for rivets 22.

Figure 6:
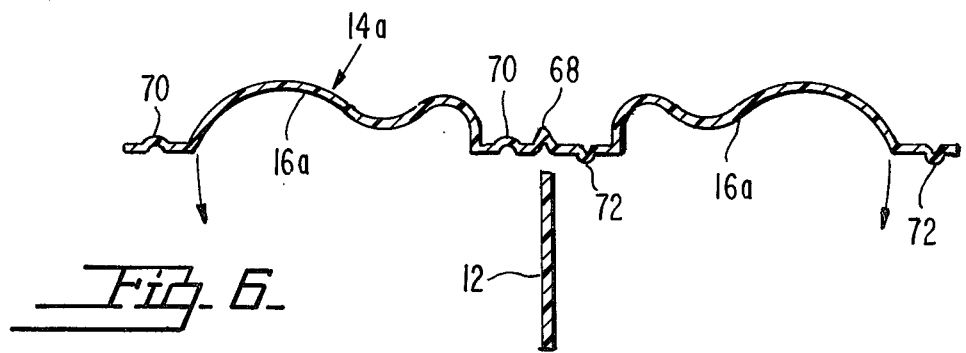
FIG. 6 is a cross-sectional view of a modified construction at an intermediate stage of manufacture.

It is further contemplated that in some instances, manufacture and assembly may be simplified by molding the opposing skins or shells of float sections fo each float 14 in a single, integral unit of polypropylene or the like, with an integral flexible hinge connection between the shells of the sections. The hinge would in this instance bridge the top edge of th skirt during manufacture as shown for example in FIG. 6, thus to eliminate fastenings along the top edge of the skirt. In this figure, the float shell 14a has an integral hinge 68, about which the opposed sections are swingable to positions in contact with the skirt. Provided on the sections are the above-mentioned, mating protuberances 70, 72 respectively.

The abstract of this application is not intended to constitute a comprehensive discussion of all the principles, possible modes or applications of the invention disclosed in this document, and should not be used to interpret the scope of the claims which appear hereinafter.

I claim:

1. A boom for restricting the movement of buoyant material beyond a predetermined area on the surface of water, comprising:
   a. an elongated, flexible skirt;
   b. float means attached to said skirt; adjacent one longitudinal edge portion thereof, and adapted for supporting the skirt buoyantly upon the surface of water in a position in which the skirt is disposed as a barrier for confining said pollutants;
   c. means at opposite ends of each skirt for connecting the same to like boom structures, whereby to provide a continuous boom capable of being floated into place in position extending about said area within which the pollutants are to be confined;
   d. an elongated, flexible tension element generally coextensive in length with the skirt and extending along the opposite longitudinal edge of said skirt; and
   e. means for attaching said tension element to the skirt, the means for attaching the tension element being fixedly secured, at spaced locations along its length, both to the skirt and to the tension element, said tension element having exposed portions between the points of permanent securement thereof to said attaching means, whereby to relieve the skirt of stresses encountered during operation of the equipment, said means for attaching the tension element to the skirt comprising clamp assemblies spaced longitudinally of the skirt, each clamp assembly including a main clamp element having a longitudinal bore through which the tension element extends, and a second clamp element lockingly engageable with the main clamp element in position to deform and lock the skirt between the main and second clamp elements, said main and second clamp elements having confronting, serrated, mating locking faces in embracing relation to the skirt; said means for effecting permanent securement of the tension element to the skirt comprising swaging of the main clamp element to the tension element.

* * * * *